(12) United States Patent
Lin

(10) Patent No.: US 7,924,417 B1
(45) Date of Patent: Apr. 12, 2011

(54) LUMINANCE MEASURING APPARATUS

(75) Inventor: I-Thun Lin, Taipei Hsien (TW)

(73) Assignee: Hon Hai Precision Industry Co., Ltd., Tu-Cheng, New Taipei (JP)

( * ) Notice: Subject to any disclaimer, the term of this patent is extended or adjusted under 35 U.S.C. 154(b) by 0 days.

(21) Appl. No.: 12/783,563

(22) Filed: May 20, 2010

(30) Foreign Application Priority Data

Jan. 27, 2010 (CN) .............................. 09 9 102327

(51) Int. Cl.
*G01J 1/42* (2006.01)
*G09F 13/04* (2006.01)
*G09G 3/36* (2006.01)

(52) U.S. Cl. .......... 356/221; 362/609; 362/632; 435/87; 435/102

(58) Field of Classification Search .......... 356/213–234, 356/72–73; 362/225, 555, 609, 612, 613, 362/632, 634; 435/87, 173, 102; 348/281.1
See application file for complete search history.

(56) References Cited

U.S. PATENT DOCUMENTS

| | | | |
|---|---|---|---|
| 5,963,280 A * | 10/1999 | Okuda et al. | 349/65 |
| 6,246,479 B1 * | 6/2001 | Jung et al. | 356/419 |
| 6,860,628 B2 * | 3/2005 | Robertson et al. | 362/555 |
| 6,992,718 B1 * | 1/2006 | Takahara | 348/333.09 |
| 2005/0259158 A1 * | 11/2005 | Jacob et al. | 348/218.1 |
| 2006/0262571 A1 * | 11/2006 | Chen | 362/632 |
| 2007/0139919 A1 * | 6/2007 | Yue | 362/225 |
| 2007/0291172 A1 * | 12/2007 | Kouzimoto et al. | 348/488 |
| 2008/0150855 A1 * | 6/2008 | Chen et al. | 345/87 |
| 2009/0033611 A1 * | 2/2009 | Mizumaki | 345/102 |
| 2010/0188324 A1 * | 7/2010 | Ohashi et al. | 345/102 |

* cited by examiner

*Primary Examiner* — Sang Nguyen

(74) *Attorney, Agent, or Firm* — Raymond J. Chew

(57) ABSTRACT

An exemplary measuring apparatus includes a base, a table, a light blocking piece, a sensor, a luminance meter, a drive assembly, and a controller. The table defines a first elongated slot. A light guide plate is arranged on the table with a central portion of a bottom surface thereof exposed to the first elongated slot. The light blocking piece is attached to the central portion of the bottom surface and exposed to the first elongated slot. The sensor is configured for sensing light and generating a sensing signal. The luminance meter is configured for measuring luminance of the back-light source module. The drive assembly is configured for moving the table to align the light blocking piece with the sensor. The controller is configured for switching off the drive assembly when the light is blocked by the light blocking piece from reaching the sensor.

17 Claims, 3 Drawing Sheets

LUMINANCE MEASURING APPARATUS

BACKGROUND

1. Technical Field

The disclosure generally relates to measuring apparatuses and, particularly, to an apparatus for measuring luminance of a back-light source module.

2. Description of Related Art

Liquid crystal displays (LCD) are widely used for being lighter and much thinner than traditional television and video displays that use cathode ray tubes (CRT). A back light source is a key element for LCDs.

One aspect of manufacturing LCDs is measuring luminance of the back-light source module. Generally, such measuring apparatus can be a spot luminance meter. However, one drawback of the spot luminance meter is that the spot luminance meter measures the back-light source module point by point. It takes too much time and is inefficient to use a spot luminance meter to measure the entire back-light source module.

What is needed, therefore, is a measuring apparatus which can overcome the limitations described.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the exemplary clamping apparatus. Moreover, in the drawings, like reference numerals designate corresponding parts throughout the several views.

DETAILED DESCRIPTION

Figure 1:
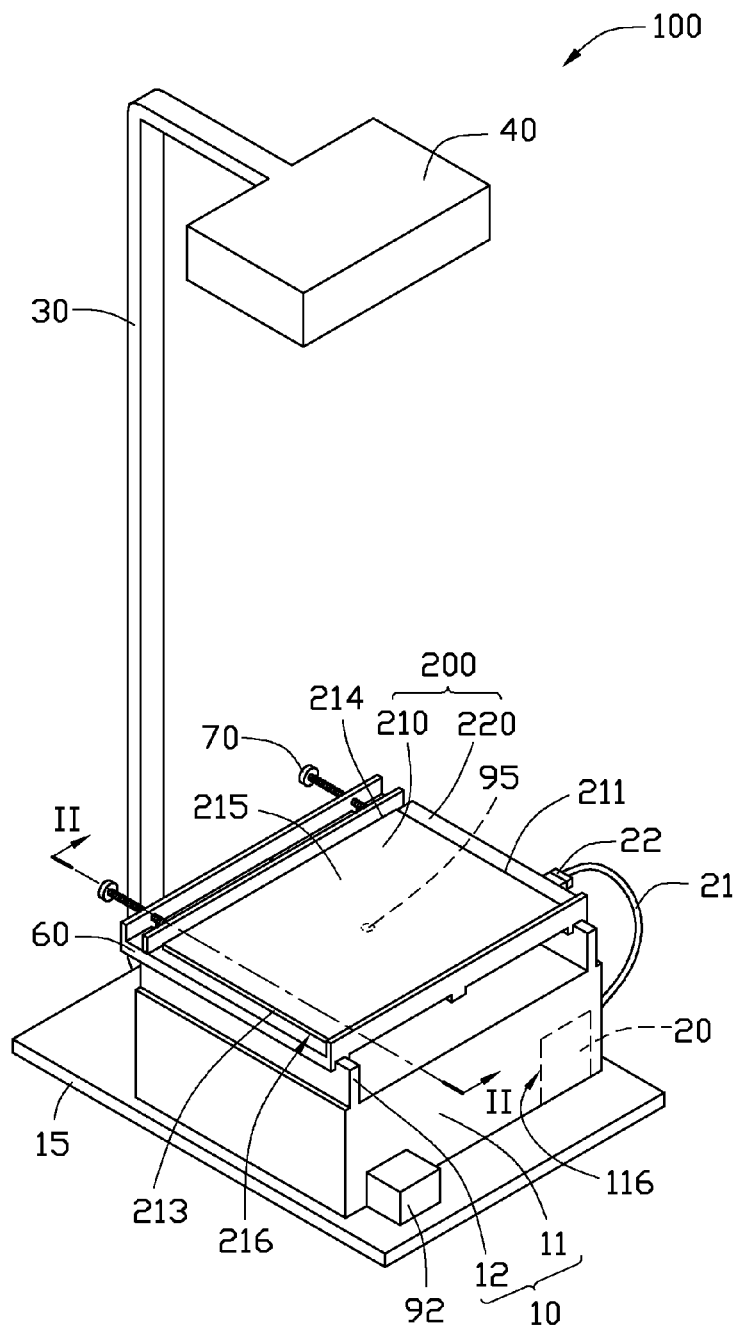
FIG. 1 is an isometric view of a measuring apparatus, in accordance with an exemplary embodiment, the measuring apparatus including a table and a clamping member.
Figure 2:
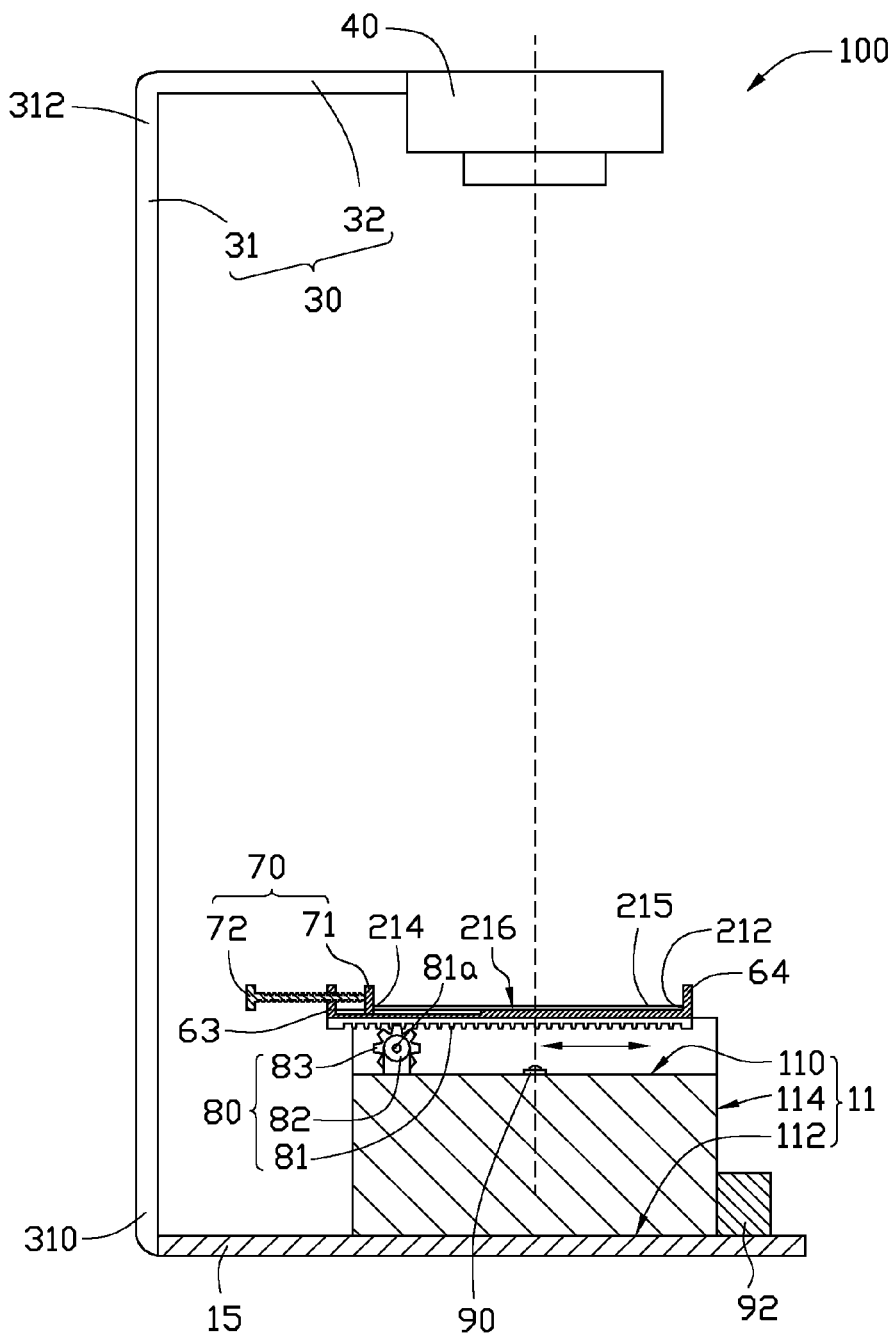
FIG. 2 is cross section of the measuring apparatus, taken along line II-II.

Referring to FIGS. 1 and 2, a measuring apparatus 100 for measuring luminance of a back light source 200 in accordance with an exemplary embodiment is shown. The back light source 200 includes a light guide plate 210 and a light source 220. The measuring apparatus 100 includes a base 10, a power supply 20, a supporting post 30, a luminance meter 40, a table 60, a clamping member 70, a drive assembly 80 (see FIG. 2), a sensor 90 (see also FIG. 2), and a light blocking piece 95.

The base 10 includes a main body 11 and at least one elongated rail 12. In this embodiment, a working table 15 is provided to support the base 10. The main body 11 is arranged on the working table 15. The main body 11 is generally rectangular, and defines a central axis M (see FIG. 2). The main body 11 includes a top surface 110, a bottom surface 112 at two opposite sides thereof, and a peripheral surface 114. The top surface 110 faces away from the working table 15. The peripheral surface 114 is located between and adjoins the top surface 110 and the bottom surface 112. The at least one elongated rail 12 includes two elongated rails 12 extend in parallel from the top surface 110 of main body 11. In particular, the main body 10 defines a receiving recess 116 in the peripheral surface 114. In this embodiment, the receiving recess 116 is located adjacent to the bottom surface 112.

The power supply 20 is fittingly received in the receiving recess 116, and is configured for providing electric current to the light source 220.

The supporting post 30 is connected to the working table 15. In this embodiment, the supporting post 30 is L-shaped, and includes a first extending portion 31 and a second extending portion 32. The first extending portion 31 extends in a direction substantially parallel to the central axis M of the main body 11, and includes a first end 310 attached to the working table 15 and an opposite second end 312. The second extending portion 32 extends from the second end 312 in a direction substantially perpendicular to the central axis M.

The luminance meter 40 is coupled to a distal end of the second extending portion 32 and faces the top surface 110 of the main body 11. In this embodiment, the luminance meter 40 can be a flat panel measurement system, and can be used to measure luminance of a surface area. The central axis M of the main body 11 passes through the luminance meter 40.

Figure 3:
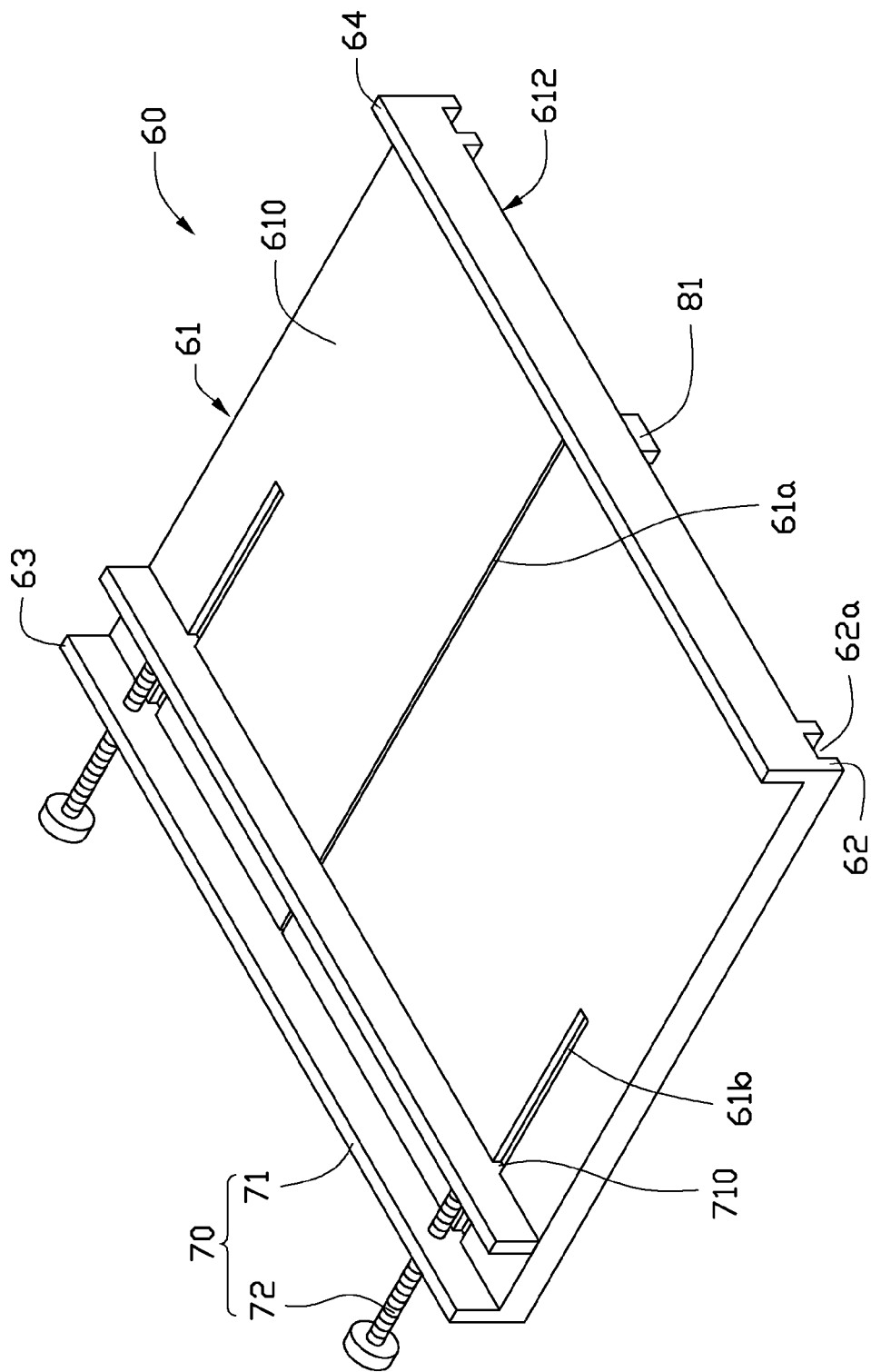
FIG. 3 is an isometric view of the table and the clamping member of FIG. 1.

Referring also to FIG. 3, the table 60 includes a base board 61, at least one engaging plate 62, a clamping plate 63, and an elongated block 64. In this embodiment, the base board 61 is generally rectangular and includes an upper surface 610 and a lower surface 612 at two opposite sides thereof. The at least one engaging plate 62 includes two engaging plates 62 each extending from the lower surface 612 of the base board 61. The two engaging plates 62 are substantially parallel with each other. The clamping plate 63 and the elongated block 64 each extend from the upper surface 610, and are substantially parallel with each other. In particular, each of the two engaging plates 62 is substantially perpendicular to the clamping plate 63 and the elongated block 64. The two engaging plates 62 each have a groove 62a defined therein for receiving the two elongated rails 12 respectively. With this configuration, the table 60 can be slidably mounted on the base 10.

In this embodiment, the base board 61 has a first elongated slot 61a and two second elongated slots 61b defined in the upper surface 610. The first and the second elongated slots 61a, 61b are substantially parallel to the two engaging plates 62. In particular, the first elongated slot 61a is defined between the clamping plate 63 and the elongated block 64, and spans through the lower surface 612. The central axis M of the main body 11 passes through the first elongated slot 61a.

The clamping member 70 includes a clamping plate 71 and at least one screw 72. The clamping plate 71 is substantially parallel to any of the clamping plate 63 and the elongated block 64. In this embodiment, the clamping plate 71 includes two extending portions 710 received in the two respective second elongated slots 61b. The at least one screw 72 includes two screws 72 each threadedly coupled to the clamping plate 63, and the screw 72 has a distal end abutting against the clamping plate 71. In operation of the clamping member 70, the light guide plate 210 can be arranged on the top surface 610 of the base board 61 between the clamping plate 71 and the elongated block 64. The light guide plate 210, for example, may be generally rectangular and includes a first peripheral side surface 211, a second peripheral side surface 212 (see FIG. 2), a third peripheral side surface 213, a fourth peripheral side surface 214, a light emitting surface 215, and a bottom surface 216. The third peripheral side surface 213 is arranged opposite to the first peripheral side surface 211. The second peripheral side surface 212 and the fourth peripheral side surface 214 are substantially parallel with each other, and are located between and adjoin the first and the third peripheral side surfaces 211, 213. The light emitting surface 215 adjoins the first peripheral side surface 211. The bottom surface 216 is located opposite to the light emitting surface 215.

In this embodiment, the first peripheral side surface 211 serves as a light incident surface, and the light source 220 is attached to the first peripheral side surface 211 to emit light beams thereto. The light source 220 is electrically connected to the power supply 20 by a wire 21, and the wire 21 is connected to the light source 220 via a plug 22. In operation of the back-light source module 200, the power supply 20 supplies electric current to the light source 220 via the wire 21. The light source 220 emits light beams to the light guide plate 210 through the first peripheral side surface 211. The light beams transmitting inside the light guide plate 210 may be reflected by the bottom surface 116 to the light output surface 115. In addition, a portion of the light beams may pass through the bottom surface 115 and may further pass through the first elongated slot 61a.

In this embodiment, the light guide plate 210 is arranged on the base board 61 with the second peripheral side surface 212 facing the block 64, and the fourth peripheral side surface 214 facing the clamping plate 71. In particular, a central region (not visible) of the bottom surface 116 is exposed to the first elongated slot 61a. In this manner, the screws 72 can be rotated to move the clamping plate 71 towards the light guide plate 210. Thereby the clamping plate 71 abuts against the fourth peripheral side surface 214 of the light guide plate 210, and further pushes the light guide plate 210 toward the block 64, until the block 64 abuts against the second peripheral side surface 214 of the light guide plate 210. As such, the light guide plate 210 is clamped by the clamping plate 71 and the block 64.

The drive assembly 80 includes a gear rack 81, a motor 82, and a gear 83. The gear rack 81 is attached to the lower surface 612 of the base board 61. The motor 82 can be a servo motor having a drive shaft 81a perpendicular to the elongated rails 12, and the motor 82 is arranged on the top surface 110 of the main body 11. The gear 83 is coupled to the drive shaft 81a and meshes with the gear rack 81. In operation of the drive assembly 80, engagement of the gear rack 81 with the gear 83 allows the motor 82 to move the table 60 with the light guide plate 210 thereon along the elongated rails 12. It is noted, in alternative embodiments, the gear rack 81 may not necessarily be attached to the base board 61. Instead, the gear rack portion can be extended from the base board 61. In particular, the gear rack portion may have a number of transverse grooves defined therein to mesh with the gear 83.

The sensor 90 can be a photo detector. In alternative embodiments, the sensor 90 can be an image sensor, such as a charge-coupled device (CCD) or a complementary metal oxide semiconductor device (CMOS). In this embodiment, the sensor 90 is arranged on the top surface 110 of the main body 11. The central axis M of the main body 11 passes through the sensor 90. Thereby, the sensor 90 faces the first elongated slot 61a to receive light beams passing through the first elongated slot 61a, and generate a sensing signal.

The measuring apparatus 100 may further include a controller 92 to receive the sensing signal from the sensor 90. In one typical application of the controller 92, the controller 92 generates a control signal to the motor 82 when no sensing signal is received. The motor 82 stops moving the table 60 when receiving the control signal from the controller 92.

The light blocking piece 95 is attached to the central portion of the bottom surface 216. In this embodiment, the light blocking piece 95 is generally round, and is used to prevent light beams passing therethrough.

In operation of the measuring apparatus 100, the clamping member 70 clamps the back-light source module 200 arranged on the table 60. The drive assembly 80 moves the table 60 with the light guide plate 210 thereon along the elongated rails 12. When the light blocking piece 95 aligns with both the luminance meter 40 and the sensor 90, light beams cannot pass through the light blocking piece 95 and the first slot 61a to the sensor 90. In such case, the sensor 90 cannot sense the light beams, thus sends no sensing signal. Accordingly, the controller 92 generates a control signal to the motor 82. The motor 82 is switched off, thus stops moving the table 60. In this manner, the luminance meter 40 aligns with light blocking piece 95. Alternatively, the sensor 90 could send a signal representative of detection of no light to the controller 92 to switch off the motor 82. In particular, the luminance meter 40 aligns with the central portion of the bottom surface 216. That is, the luminance meter 40 aligns with a central region of the light guide plate 210.

One advantage of the measuring apparatus 100 is that precise alignment of the luminance meter 40 and the central region of the light guide plate 210 can be achieved by moving the light blocking piece 95 to align with the sensor 90. Thus, the luminance meter 40 can be used to precisely measure luminance of the back-light source module 200.

It is believed that the exemplary embodiment and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. A measuring apparatus for measuring luminance of a back-light source module, the back-light source module comprising a light guide plate and a light source coupled to the light guide plate, the light guide plate comprising a light output surface and a bottom surface opposite to the light output surface, the measuring apparatus comprising:
    a base;
    a table slidably mounted on the base, the table defining a first elongated slot, the first elongated slot configured for exposing a central portion of the bottom surface of the light guide plate arranged on the table, and allowing light from the light guide plate to pass therethrough;
    a light blocking piece for attachment to the central portion of the bottom surface of the light guide plate and being exposed to the first elongated slot;
    a sensor arranged on the base for sensing light passing through the first elongated slot and generating a sensing signal associated therewith;
    a luminance meter configured for facing the light output surface of the light guide plate and measuring luminance of the back-light source module when the luminance meter aligns with the central portion of the bottom surface;
    a drive assembly for moving the table to align the light blocking piece with the sensor; and
    a controller configured for switching off the drive assembly when the light is blocked by the light blocking piece from reaching the sensor.

2. The measuring apparatus of claim 1, wherein the base comprises at least one elongated rail substantially parallel with the first elongated slot, the table defines a groove receiving the at least one elongated rail.

3. The measuring apparatus of claim 1, wherein the drive assembly comprises:
    a gear rack attached to the table;
    a motor having a shaft; and
    a gear mechanically coupled to the shaft and meshed with the gear rack.

4. The measuring apparatus of claim 3, wherein the controller is configured for sending a control signal to the motor to switch off the motor when the light is blocked by the light blocking piece from reaching the sensor.

5. The measuring apparatus of claim 1, further comprising a clamping member for clamping the light guide plate on the table.

6. The measuring apparatus of claim 5, wherein the table comprises a block, the clamping member comprises:
   a clamping plate slidably attached to the table, the clamping plate and the block configured for clamping the light guide plate therebetween; and
   at least one screw threadedly coupled to the table and abutting the clamping plate.

7. The measuring apparatus of claim 6, wherein the clamping plate comprises at least one extending portion, the table defines at least one second elongated slot receiving the at least one extending portion.

8. The measuring apparatus of claim 1, further comprises a power supply electrically connected to the light source, the base having a receiving recess receiving the power supply.

9. The measuring apparatus of claim 1, wherein the sensor comprises one of an image sensor and a photo detector.

10. A measuring apparatus for measuring luminance of a back-light source module, the back-light source module comprising a light guide plate and a light source optically coupled to the light guide plate, the light guide plate comprising a light output surface and a bottom surface opposite to the light output surface, the measuring apparatus comprising:
    a base;
    a table slidably attached to the base, the table defining a first elongated slot for exposing a central portion of the bottom surface of the light guide plate arranged on the table and allowing light from the light guide plate to pass therethrough;
    a light blocking piece for attachment to the central portion of the bottom surface of the light guide plate and being exposed to the first elongated slot;
    a sensor arranged on the base for sensing light passing through the first elongated slot and generating a sensing signal associated therewith;
    a luminance meter configured for facing the light output surface of the light guide plate and measuring luminance of the back-light source module when the luminance meter aligns with the central portion of the bottom surface;
    a drive assembly for moving the table to align the light blocking piece with the sensor, the drive assembly comprising:
       a gear rack attached to the table,
       a motor having a shaft, and
       a gear mechanically coupled to the shaft and meshed with the gear rack; and
    a controller configured for switching off the drive assembly according to the sensing signal from the sensor.

11. The measuring apparatus of claim 10, wherein the base comprises at least one elongated rail substantially parallel with the first elongated slot, the table defines a groove receiving the at least one elongated rail.

12. The measuring apparatus of claim 10, wherein the controller sends a control signal to the motor for switching off the motor when no sensing signal is sent by the sensor.

13. The measuring apparatus of claim 10, further comprising a clamping member for clamping the light guide plate on the table.

14. The measuring apparatus of claim 13, wherein the table comprises a block, the clamping member comprises:
    a clamping plate slidably attached to the table, the clamping plate and the block configured for clamping the light guide plate therebetween;
    at least one screw threadedly coupled to the table and abutting the clamping plate.

15. The measuring apparatus of claim 14, wherein the clamping plate comprises at least one extending portion, the table defines at least one second elongated slot receiving the at least one extending portion.

16. The measuring apparatus of claim 10, further comprises a power supply electrically connected to the light source, the base having a receiving recess receiving the power supply.

17. The measuring apparatus of claim 10, wherein the sensor comprises one of an image sensor and a photo detector.

* * * * *